C. M. FEIST.
SELF LUBRICATING BEARING OR AXLE.
APPLICATION FILED MAR. 2, 1921.
1,428,425.
Patented Sept. 5, 1922.
2 SHEETS—SHEET 2.
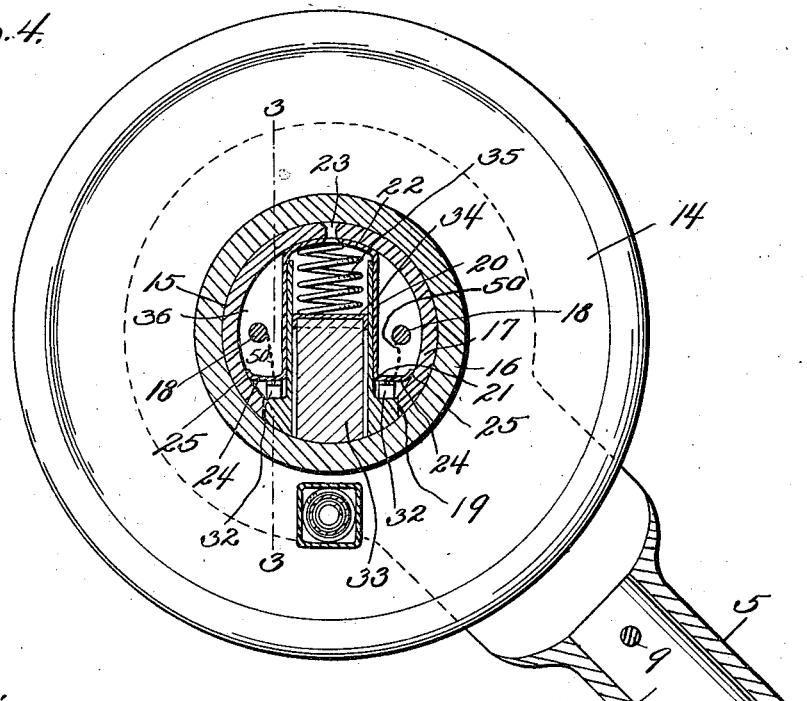
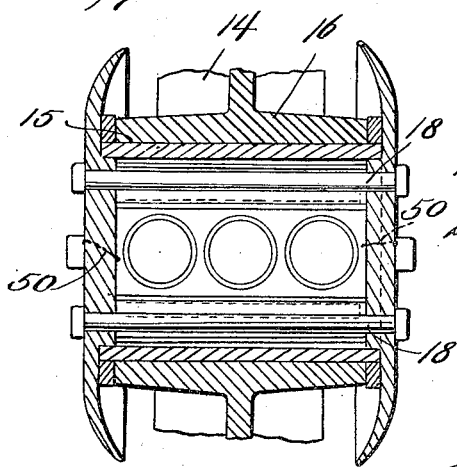
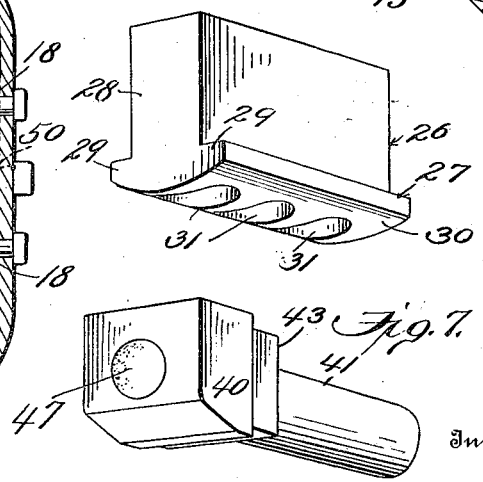
Inventor
Charles M. Feist
By
Attorney Patented Sept. 5, 1922.

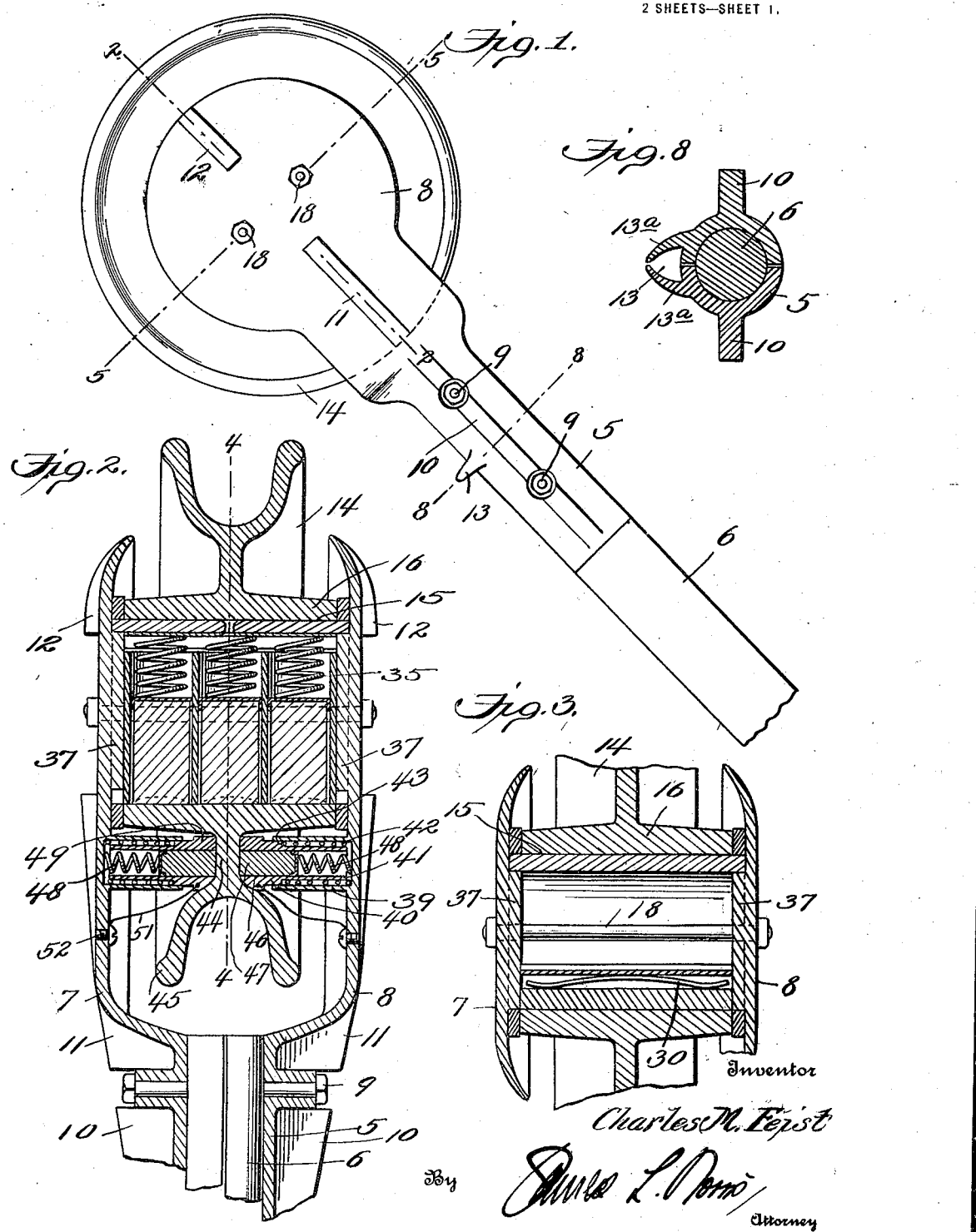

1,428,425

UNITED STATES PATENT OFFICE.

CHARLES M. FEIST, OF SIOUX CITY, IOWA.

SELF-LUBRICATING BEARING OR AXLE.

Application filed March 2, 1921. Serial No. 449,176.

*To all whom it may concern:*

Be it known that I, CHARLES M. FEIST, a citizen of the United States, residing at Sioux City, in the county of Woodbury and State of Iowa, have invented new and useful Improvements in Self-Lubricating Bearings or Axles, of which the following is a specification.

This invention relates to wheels and bearings of that type having self-lubricating characteristics, and particularly to bearings or axles for trolley wheels, and the general object of the invention is to improve bearings or axles of this class by providing a novel form of self-lubricating organization as a part of the same, and to so dispose the lubricating means that both the interior of the bore of the hub of the trolley wheel and a portion of the exterior of the latter will be lubricated. A further object of the invention is to provide a bearing structure particularly adapted for trolley wheels wherein the electrical transmission connections between the trolley wheel and the harp members are increased, with material electrical advantages and without passing the current directly through the bearing structure, and thereby avoid deteriorating or drying out the lubricant and blistering the bearing or axle components. A further object of the invention is to improve the general specific construction and arrangement of the several parts of a bearing or axle for a trolley wheel in such manner as to effect an accurate fitting and efficient performance of the structural functions of the parts, and also permit a ready separation of the wheel and bearing or axle.

With these and other objects and advantages in view, the invention consists in the construction and arrangement of the several parts which will be more fully hereinafter described and claimed.

In the drawings:

Fig. 1 represents a side elevation showing a trolley wheel and harp embodying the features of the invention and illustrating a part of the trolley pole attached thereto.

Fig. 2 is an enlarged transverse vertical section on the line 2—2, Fig. 1.

Fig. 3 is an enlarged transverse vertical section of the trolley wheel and bearing taken on the line 3—3, Fig. 4.

Fig. 4 is a transverse vertical section taken on the line 4—4, Fig. 2.

Fig. 5 is a section taken on the line 5—5, Fig. 1.

Figs. 6 and 7 are detail perspective views, respectively, of the main lubricating segment or shoe and one of the auxiliary lubricating shoes.

Fig. 8 is a transverse vertical section taken on the line 8—8, Fig. 1.

The present invention is particularly directed to improvements on the construction and arrangement of the parts of the lubricating axle disclosed in my pending application, Serial No. 399,840, filed July 29, 1920, and wherein a tubular body having an opening in the side wall thereof has a casing extending diametrically across and partially occupying the interior space of the body and provided with an automatically operating lubricating means therein.

The numeral 5 designates a socket at the upper end of the usual form of trolley pole 6, this socket having a pair of jaws or sections 7 and 8 of duplicate construction extending therefrom and providing opposite halves of the harp. The trolley pole 6 is secured in the socket by transverse bolts or analogous fastenings 9, and disposed on the socket are combined guard and reinforcing ribs 10 projecting outwardly from diametrically opposite portions of the upper part of the socket and also continuing upwardly over the centers of the harp halves or members 7 and 8, as at 11 and 12. The ribs 11 and 12 are separated at their inner terminals to clear the centers of the harp halves or members to facilitate the insertion of fastening devices in the centers of said halves, and which will be presently explained. The ribs 10, 11 and 12 also prevent the bolt heads and nuts of the several fastening devices from hooking on overhead or feed wires, the said ribs standing out far enough and having such shape as to cause the wires to clear the bolt heads or nuts serving as the fastening means for the several parts of the improved device. In suitable position on the socket 5 a rope eye 13 is disposed, and in the present instance is formed by half sections 13ª projecting from the parts or sections of the socket 5, the sections of the socket being continued as parts of the harp halves.

The harp is recessed, or the halves 7 and 8 thereof are spaced such relative distances as to receive a grooved trolley wheel 14, which has an enlarged central eye or cylindrical bore 15 of equal diameter throughout its length and extending from end to end through a hub 16. The hub is rotatable and closely fitted on a spool-like bearing or axle 17 of equal diameter throughout its length and held fixed between the harp halves or sections 7 and 8 by removable bolts 18 extending through the said harp halves or sections and the bearing or axle on opposite sides of the center of the latter, as shown by Figs. 4 and 5. The bearing or axle 17 is of shell-like form, or is primarily tubular and constructed of hard metal or steel, but by its tubular form is rendered comparatively light in weight. An opening 19 is cut through and extends longitudinally of the bearing or axle 17, the said opening extending the full length of the bearing or axle, or from end to end thereof. In the bearing or axle a casing 20 is secured in fixed position and has a fully open outer end 21. The opposite end 22 of the casing is closed and conforms in contour to the inner surface of the bearing or axle 17 and is snugly fitted against and held fast to the bearing or axle by rivets or fastenings 23. The outer open end 21 of the casing 20 is formed with laterally projecting flanges 24 secured as at 25 to adjacent portions of the tubular bearing or axle 17, as clearly shown by Fig. 4. The flanges 24 are disposed at a distance inwardly from the side walls of the opening 19 of the bearing or axle 17 for a purpose which will be presently explained. Within the casing 20 a segmental holder or carrier 26 is disposed and comprises an outer head 27 and a body 28 which is preferably rectangular in contour. The head 27 is of greater width than the body 28 to provide opposite side flanges 29, the outer side 30 of the head being of convex contour and having formed therethrough a plurality of openings 31. The segmental holder or carrier 26 is movably fitted in the casing 20, and between the flanges 24 of said casing and the flanges 29 of the head 27 springs 32 are introduced and preferably formed of strips of flat spring steel, the springs 32 operating to normally project the holder or carrier 26 to bring the lubricating device in contact with the bore 15 of the hub 16. Cylinders or sticks 33 of lubricating material are mounted in the openings 31 of the holder or carrier 26 and preferably have metal caps 34 on their inner ends engaged by springs 35 introduced between the caps and the inner convex end 22 of the casing 20. By this means the lubricating cylinders, sticks or plugs are maintained in contact with the bore 15 of the hub 16, the springs 22 having such dimensions and action on the cylinders or plugs 33 as to insure an economical use of the lubricating material. Owing to the reduced dimensions of the casing 20 relatively to the interior space of the tubular bearing or axle 17, clearances or space compartments 36 are formed between opposite sides of the said casing 20 and the adjacent portions of the tubular bearing 17 for insertion of the fastening bolts 18. This occupation of only a portion of the interior space of the tubular bearing or axle 17 by the casing 20 also provides air chambers at opposite sides of the said casing to effect desirable ventilation of the bearing or axle and reduce the heating tendency of the latter to a minimum. The opposite inner sides of the harp halves or sections 7 and 8 adjacent to their upper terminals are formed with inwardly projecting circular bosses 37 which snugly fit in and close the opposite normally open ends of the tubular bearing or axle 17 and also set up a reliable electrical contact between the said bearing or axle and the harp halves or sections, and further serve as means for positive placement of the bearing or axle. Between the opposite ends of the hub 16 and the adjacent inner surfaces of the harp halves or sections 7 and 8 washers 38 are interposed, said washers being preferably formed of fiber or other anti-frictional material. These washers prevent cutting of the bearing or axle or undue wear by the wheel hub on the axle or bearing at opposite edges thereof.

In addition to the lubricating means disposed and operating interiorly of the hub 16, the present improvement also comprises supplemental means for lubricating a portion of the trolley wheel 14 exteriorly of the hub 16, and to accommodate this additional or supplemental lubricating means, the harp halves or sections 7 and 8 at a short distance below the bosses 37 have inwardly projecting bored cylindrical supports 39 which are fully open at their inner ends. In the supports 39 lubricating shoes 40 are movably mounted and have reduced shanks 41 surrounded by springs 42 bearing against the outer terminals or end walls of the bores of the supports 39 and also against circumferential shoulders 43, formed by the reduction of the shanks 41. These springs 42 tend to force the shoes 40 inwardly to bear against the web 44 of the trolley wheel 14 between the hub 16 and the outer grooved feed wire engaging periphery or member 45 of said trolley wheel, as clearly shown by Fig. 2. Each shoe 40 is also bored from end to end thereof, as at 46, to movably receive lubricating cylinders or plugs 47, which are inwardly projected or fed by springs 48 interposed between the outer ends of the plugs 47 and the outer end walls of the bores of the supports 39. The plugs 47 in this instance will also preferably have caps 48$^a$ removably applied to the outer ends thereof against which the inner terminals of the springs 48 will have contact. The shoes 40 have inner terminal heads 49 which are shaped to snugly engage or fit the parts of the trolley wheel with which the inner ends of the said shoes are adapted to coact.

As hereinbefore indicated, the present improved bearing or axle structure permits and includes advantageous electrical connections for obviating deterioration or drying out of the lubricant and injuring the bearing or axle components. These electrical connections are made by means of wires 50 between the opposite sides of the head 27 of the holder or carrier 26 and the bolt heads and nuts of the bolts 18, or between the said holder or carrier head and portions of the harp halves or sections 7 and 8 adjacent to said bolt heads and nuts. Additional connecting wires 51 are also interposed between the head 49 of the shoes 40 and connecting screws 52 applied to the opposite halves or sections of the harp below the supplemental or additional lubricating means, as clearly shown by Fig. 2.

The improved bearing or axle wheel and harp halves or sections may be readily associated, and, if necessary, the said parts may be easily separated simply by removing the bolts 18. When the harp halves or sections 7 and 8 are applied to the improved bearing or axle carrying the trolley wheel, the supplemental or additional lubricating attachments or means are disposed in operative relation relatively to opposite sides of the trolley wheel without requiring any adjustment or other manipulation.

The operation of the lubricating features of the improved bearing or axle is very simple, the lubricating plugs 33 being exposed at their outer ends to, and held in contact with, the bore 15 of the hub 16 of the trolley wheel 14, it being preferred that this main lubricating means be so arranged that the plugs 33 will be brought into contact with the lower portion of the hub bore. As the plugs 33 wear away, the springs 35 continuously operate to project the said plugs until the latter are reduced to a minimum, when other plugs may be placed in the caps 34. The supplemental or additional lubricating means, including the shoes 40 and the lubricating plugs 47 therein, will thoroughly lubricate the web 44 of the trolley wheel and materially reduce the friction of the latter and render said wheel more free in its rotating action. As hereinbefore specified, the shoes 40 also serve as additional means for facilitating transmission of the current from the trolley wheel by means of the wires 51 to the harp halves or sections 7 and 8, and, likewise, the opposite sides of the head 27 or holder or carrier 26 take the current from the wheel hub 16 and transmit it to the opposite halves or sections of the harp.

The improved bearing or axle and its co-operating components has been described as particularly applied to a trolley wheel. It will be understood, however, that the same may be used in connection with other electrical conducting wheels, and the reference to a trolley wheel is understood to mean any type of wheel that is utilized for transmitting the current from an overhead feed wire. The improved structure also makes it possible to materially reduce the cost of construction of bearings or axles of this type, and particularly self-lubricating bearings, and the cost of upkeep of the same is reduced to a minimum. Another important feature is the comparative lightness of the improved bearing or axle, which is made possible by the specific construction thereof, as hereinbefore explained. The improved bearing or axle also embodies therein the necessary strength and durability which is required in devices of this class.

What is claimed as new is:

1. A wheel bearing for trolley wheels and the like, consisting of a cylindrical tubular body on which the hub of the wheel is mounted, automatically operating lubricating means wholly enclosed within the said body and acting on the inner side of the wheel hub, and a supplemental lubricating means comprising inwardly automatically movable lubricating material engaging the opposite portions of the flange of the trolley wheel between the hub of the latter and the outer grooved member.

2. In a device of the class specified, a wheel having a hub and a peripheral engaging portion, lubricating means acting on the interior of the hub of the wheel, and supplemental lubricating means having automatically inwardly fed lubricating material bearing on the opposite exterior surfaces of the body of the wheel between the hub of the latter and the outer engaging portion thereof.

3. In a device of the class specified, a wheel having a hub and an outer engaging portion, lubricating means disposed and acting directly on the interior portion of the hub, supporting means for the wheel, and supplemental lubricating means held by opposite parts of the supporting means and provided with inwardly projecting automatically fed lubricating material bearing on the surfaces of the opposite sides of the wheel between the hub and the outer engaging portion thereof.

4. In a device of the class specified, a wheel having a hub and an outer engaging portion, opposite sections holding the wheel therebetween, lubricating means disposed in and acting to lubricate the inner side of the hub, and supplemental lubricating means comprising inwardly projecting supports held by the sections and automatically movable inwardly extending lubricating plugs bearing on the outer surface of the body of the wheel between the hub and outer engaging portion thereof.

5. In a device of the class specified, a wheel having a hub with a bore therethrough, a cylindrical tubular body removably disposed in the hub bore and having an opening in the side wall thereof, a casing extending diametrically across and partially occupying the interior space of the body and having its outer end open and inner end closed, an automatically operating lubricating means mounted in the casing for interiorly lubricating the hub of the wheel, and supplemental lubricating means located exteriorly of the hub and engaging opposite portions of the wheel.

6. A wheel bearing of the class specified, consisting of a cylindrical tubular body having an opening in the side wall thereof, a casing partially occupying the interior space of the body, a holder movably mounted in the casing and having an outer extremity exposed through the opening in the said tubular body, springs interposed between parts of the casing and the holder for normally expelling the latter, and lubricating means mounted in the holder and having devices for automatically projecting the same outwardly through the said holder.

7. A wheel bearing of the class specified, consisting of a cylindrical tubular body having an opening in the side wall thereof, a casing partially occupying the interior space of the body and having its inner end closed and outer end open, a holder movably mounted in the casing and having a head which is projected through the opening of the said tubular body, means for normally projecting the holder and engaging opposite sides of the head and adjacent parts of the casing, and lubricating devices movably mounted and having a self-feed outwardly through said holder.

8. In a device of the class specified, a wheel having a hub, a cylindrical body extending through the hub and having an opening in the side wall thereof, opposite supporting sections engaging the cylindrical tubular body and having the wheel and hub confined therebetween, lubricating means mounted in the said body and exposed to the interior of the wheel hub, and opposed lubricating devices carried by the said sections and engaging portions of the wheel, the latter lubricating devices comprising inwardly movable shoes carrying self-feeding lubricating plugs.

9. In a device of the class specified, a wheel having a hub, a cylindrical tubular body extending through the hub and having an opening in one side thereof, lubricant carrying means projectible through the opening of the tubular body to lubricate the interior of the hub, supporting sections engaging the opposite ends of the tubular body and having inwardly projecting tubular supports at a distance from the wheel hub, shoes carrying lubricating means held in the said tubular supports to engage an exterior portion of the wheel, and electrical connections between portions of the sections and the lubricating means in the tubular body and in the said tubular supports.

10. In a device of the class specified, a wheel having a hub, a tubular body extending through the hub and provided with an opening in the side wall thereof, lubricating means mounted in the tubular body and including a holder having outer heads in contact with the hub, supporting sections engaging opposite ends of the tubular body, electrical connections between the heads of the said holder and the supporting sections, lubricating means extending inwardly from the sections in opposed relation and having headed shoes engaging a portion of the wheel exterior of the hub, and electrical connections between the heads of the said shoes and the sections.

In testimony whereof I have hereunto set my hand in presence of two subscribing witnesses.

CHARLES M. FEIST.

Witnesses:
DOROTHY DE BEER,
H. B. GREGORY.